US010248545B2

(12) United States Patent
Dominguez et al.

(10) Patent No.: US 10,248,545 B2
(45) Date of Patent: Apr. 2, 2019

(54) METHOD FOR TRACKING HIGH-LEVEL SOURCE ATTRIBUTION OF GENERATED ASSEMBLY LANGUAGE CODE

(71) Applicant: PARASOFT CORPORATION, Monrovia, CA (US)

(72) Inventors: Daniel J. Dominguez, Azusa, CA (US); Joshua William Scoggins, Azusa, CA (US); Richard Kent Newman, North Hollywood, CA (US); Uwe Samitsch Kronholm, Fullerton, CA (US)

(73) Assignee: PARASOFT CORPORATION, Monrovia, CA (US)

( * ) Notice: Subject to any disclaimer, the term of this patent is extended or adjusted under 35 U.S.C. 154(b) by 170 days.

(21) Appl. No.: 15/392,563

(22) Filed: Dec. 28, 2016

(65) Prior Publication Data

US 2017/0235670 A1 Aug. 17, 2017

Related U.S. Application Data

(60) Provisional application No. 62/296,525, filed on Feb. 17, 2016.

(51) Int. Cl.
*G06F 8/41* (2018.01)
*G06F 11/36* (2006.01)

(52) U.S. Cl.
CPC ............ *G06F 11/3672* (2013.01); *G06F 8/41* (2013.01); *G06F 8/447* (2013.01); *G06F 11/3684* (2013.01)

(58) Field of Classification Search
CPC . G06F 11/36; G06F 8/41; G06F 8/447; G06F 11/3672; G06F 11/3684
See application file for complete search history.

(56) References Cited

U.S. PATENT DOCUMENTS

| 5,815,719 A * | 9/1998 | Goebel | G06F 8/4441 |
| | | | 717/146 |
| 5,854,929 A * | 12/1998 | Van Praet | G06F 8/41 |
| | | | 717/156 |
| 6,247,174 B1 * | 6/2001 | Santhanam | G06F 8/447 |
| | | | 717/154 |

(Continued)

OTHER PUBLICATIONS

Mikhail Buinevich et al. "Method and Utility fro Recovering Code Algorithms of Telecommunication Device for Vunlerability Search", [Online], 2014, pp. 172-176, [Retrieved from Internet on Dec. 22, 2018], <https://ieeexplore.ieee.org/stamp/stamp.jsp?arnumber=6778943>.*

(Continued)

*Primary Examiner* — Ziaul A Chowdhury
(74) *Attorney, Agent, or Firm* — Lewis Roca Rothgerber Christie LLP

(57) ABSTRACT

A method for tracking high-level source attribution of a generated assembly language code includes: receiving commands for compiling or linking a high-level language code; analyzing the received commands to determine whether a command is a compiler command for compiling the high-level language code or a link command for linking the low level object code; when the command is a compiler command: generating assembly language code by compiling the high-level language code, parsing the generated assembly language code to generate an internal representation for the assembly language code, storing the internal representation in a computer memory; and generating associated linker input artifacts for linking; when the command is a link command: updating the internal representation with the associated linker input artifacts; and generating a report file from the updated internal representation.

18 Claims, 6 Drawing Sheets

(56) References Cited

U.S. PATENT DOCUMENTS

| | | | |
|---|---|---|---|
| 6,253,373 B1* | 6/2001 | Peri | G06F 8/443 717/150 |
| 6,473,707 B1* | 10/2002 | Grey | G06F 11/3684 702/108 |
| 6,577,981 B1* | 6/2003 | Grey | G06F 11/3684 702/118 |
| 6,804,682 B1* | 10/2004 | Kemper | G06F 8/72 |
| 2003/0167458 A1* | 9/2003 | Santhanam | G06F 8/41 717/114 |
| 2004/0015866 A1* | 1/2004 | Estep | G06F 11/3684 717/124 |
| 2004/0055000 A1* | 3/2004 | Miyake | G06F 12/0837 718/105 |
| 2004/0193957 A1* | 9/2004 | Swoboda | G06F 8/41 714/30 |
| 2005/0044538 A1* | 2/2005 | Mantripragada | G06F 8/443 717/151 |
| 2005/0071818 A1* | 3/2005 | Reissman | G06F 11/3672 717/127 |
| 2006/0047974 A1* | 3/2006 | Alpern | G06F 9/44521 713/191 |
| 2006/0190937 A1* | 8/2006 | Wadsworth | G06F 8/20 717/151 |
| 2007/0124722 A1* | 5/2007 | Gschwind | G06F 8/445 717/106 |
| 2007/0130565 A1* | 6/2007 | Fan | G06F 8/54 717/173 |
| 2007/0157180 A1* | 7/2007 | Tillmann | G06F 11/3672 717/140 |
| 2008/0288834 A1* | 11/2008 | Manovit | G06F 11/28 714/718 |
| 2010/0218149 A1* | 8/2010 | Sasaki | G06F 17/5022 716/106 |
| 2010/0318933 A1* | 12/2010 | McMahan | G06F 11/3672 715/772 |
| 2011/0107295 A1* | 5/2011 | Banavar | G06Q 10/00 717/104 |
| 2015/0058856 A1* | 2/2015 | Rippingale | G06Q 30/06 718/102 |
| 2015/0370544 A1* | 12/2015 | Santry | G06F 8/41 717/145 |
| 2016/0306790 A1* | 10/2016 | Mos | G06Q 10/067 |
| 2017/0052881 A1* | 2/2017 | Tojo | G06F 11/3672 |
| 2017/0139694 A1* | 5/2017 | Larin | G06F 8/4441 |

OTHER PUBLICATIONS

J. Bergeron, M. Debbabi et al., "Static Detection of Malicious Code in Executable Programs", [Online], 2001, pp. 1-9, [Retrieved from Internet on Dec. 23, 2018], <https://pdfs.semanticscholar.org/a09b/8f7bbf24f80e037b06578fe6308babfca1a8.pdf>.*

* cited by examiner

FIG. 4

Interleaved Assembly Report

1. #line 3 "interleaver_example.cc"
2. #line 1 "templates.h"
3. # instantiation of template "T1 template_foo<T1>(T1) [with T1=int]", defined in "templates.h:4"
4. # template<class T>
5. # T template_foo(T item) {
6. T1 template_foo<T1>(T1) [with T1=int]:
7. #line 6 "templates.h"
8. # return item * item;
9.     mullw    r3, r3, r3
10.     blr
11. # }
12. #line 8: "interleaver_example.cc"
13. # int main(void) {
14. main:
15. # int temp = 19;
16.     li    r30, 19
17. # int temp2;
18. # inline_bar_set(template_foo(128));
19. # call template "T1 template_foo<T1>(T1) [with T1=int]", defined in "templates.h:4", instantiated in "interleaver_example.s:6"
20.     li    r3, 128
21.     bl    T1 template_foo<T1>(T1) [with T1=int]
22. #line 8 "inlines.h"
23. # inline void inline_bar_set(int val) {
24. # srand(val);
25.     bl    srand
26. # }
27. #line 13 "interleaver_example.cc"
28. # do {
29. ..L30:
30. #line 11 "inlines.h"
31. # inline int inline_bar_use(void) {
32. # return rand();
33.     bl    rand
34. # }
35. #line 14 "interleaver_example.cc"
36. # temp = inline_bar_use() % 10;
37.     modwi r30, r3, 10

FIG. 4 (Continued)

```
38. #line 11 "inlines.h"
39. # inline int inline_bar_use(void) {
40. #   return rand();
41.       bl    rand
42. # }
43. #line 15 "interleaver_example.cc"
44. #   temp2 = inline_bar_use() % 173;
45.       modwi r30, r3, 173
46. #   printf("Random numbers: %d, %d\n", temp, temp2);
47.       ldw   r3, .L47
48.       mr    r4, r30
49.       mr    r5, r31
50.       bl    printf
51. #line 4 "preprocessor_dirctives.h"
52. # #define getmax(a,b) ((a)>(b)?(a):(b))
53.       mr    r12, r31
54.       cmpw  r30, r31
55.       ble   .L48
56.       mr    r12, r30
57. #line 17 "interleaver_example.cc"
58. # } while (getmax(temp,temp2) != 0);
59. .L48:
60.       cmpwi     r12, 0
61.       bne   .L30
62. #   return temp;
63.       mr    r3, r30
64.       blr
65. # }
66. .L47: .stringz "Random numbers: %d, %d\n"
```

METHOD FOR TRACKING HIGH-LEVEL SOURCE ATTRIBUTION OF GENERATED ASSEMBLY LANGUAGE CODE

CROSS-REFERENCE TO RELATED APPLICATIONS

This Patent Application claims the benefits of U.S. Provisional Patent Application Ser. No. 62/296,525, filed on Feb. 17, 2016 and entitled "Method For Tracking High-Level Source Attribution Of Generated Assembly Language Code," the entire content of which is hereby expressly incorporated by reference.

FIELD OF THE INVENTION

The present invention relates generally to computer software testing, and more particularly to tracking high-level source attribution of generated assembly language code.

BACKGROUND

Assembly language is a low-level programming language for a computer (or other programmable device), typically with a one-to-one correspondence between the language and the machine code instructions. Each assembly language is specific to a particular computer architecture. High-level computer programming languages are generally portable across multiple machine architectures but require converting into low-level assembly language code. This process is called compiling. Low-level assembly language code is converted into a non-executable machine code object by an assembler. This conversion process is called assembling, or assembling the low-level assembly language source code. The non-executable machine code objects are then combined together with library object code using a tool known as a linker. This process is called linking.

Assembly languages use mnemonics to represent each low-level machine instruction or operation. Typical operations require one or more operands in order to form a complete instruction; most assemblers can therefore take labels, symbols and expressions as operands to represent addresses and other constants. Many assemblers offer additional mechanisms to facilitate program development, to control the assembly process, and to aid debugging.

However, correlating low-level assembly language code back to the original high-level language source code is difficult, because some high-level constructs, such as template declarations, have no direct representation in the resultant low-level assembly language code. For example, instantiation of template declarations are embedded in the low-level assembly language code with no correlation back to the original high-level language source code. Therefore it is not currently possible to correlate template instantiations with template declarations. Similar problems exist with inline functions and compiler function-like preprocessor macros. There is currently no automatic way to perform the full correlation and all known techniques are ad-hoc in design. It is currently possible to associate assembly language code labels with function names and certain code constructs such as normal functions and global variables. However, template declarations, inline functions, and preprocessor function-like macros lose correlation during compilation of original high-level source code, as a necessary and expected function of compilation.

SUMMARY

In some embodiments, the present invention is a computer-implemented method for tracking high-level source attribution of a generated assembly language code. The method includes: receiving commands for compiling or linking a high-level language code; analyzing the received commands to determine whether a command is a compiler command for compiling the high-level language code or a link command for linking the low level object code; when the command is a compiler command: generating assembly language code by compiling the high-level language code, parsing the generated assembly language code to generate an internal representation for the assembly language code, storing the internal representation in a computer memory; and generating associated linker input artifacts for linking; when the command is a link command: updating the internal representation with the associated linker input artifacts; and generating a report file from the updated internal representation.

In some embodiments, the present invention is a non-transitory compute readable storage medium for storing a computer program for tracking high-level source attribution of a generated assembly language code, the computer program when executed by a computer preforming a process, the process including: receiving commands for compiling or linking a high-level language code; analyzing the received commands to determine whether a command is a compiler command for compiling the high-level language code or a link command for linking the low level object code; when the command is a compiler command: generating assembly language code by compiling the high-level language code, parsing the generated assembly language code to generate an internal representation for the assembly language code, storing the internal representation in a computer memory; and generating associated linker input artifacts for linking; when the command is a link command: updating the internal representation with the associated linker input artifacts; and generating a report file from the updated internal representation.

In some embodiments, the internal representation for the assembly language code is generated by assigning generic tokens to categorize each kind of low-level assembly construct in order to abstract away machine specific details. In some embodiments, the unresolved and missing metadata is resolved by matching missing information to template declarations, preprocessor function-like macros, and inline functions using pattern matching.

In some embodiments, the invention may generate test coverage metrics from the updated internal representation. The test coverage may then be used to verify correctness of a compiler comping the high-level language code.

In some embodiments, the invention further instruments the updated internal representation for coverage metrics; generates instrumented low level assembly language source code from the instrumented internal representation; assembles the instrumented low level assembly language source code to produce object code, linking the object modules in the object codes to produce an executable binary image file; executes the executable binary image file to extract dynamic coverage information; and merges the dynamic coverage information and the updated internal representation to produce test coverage reports.

BRIEF DESCRIPTION OF THE DRAWINGS

FIG. 4 illustrates an exemplary low-level assembly language code interleaved report file, according to some embodiments of the disclosed invention.

DETAILED DESCRIPTION

In some embodiments, the disclosed invention collects high-level constructs in both high-level source code and low-level assembly language code and automatically correlates them, producing a report which shows line by line attribution in the assembly language source code listing of the corresponding, and previously missing high-level source code constructs. As one skilled in the art would recognize, a low-level programming language (code) is a programming language that provides little or no abstraction from a processor's instruction set architecture commands or functions and generally refers to machine code or assembly language.

The disclosed invention improves a wide variety of different computer related technologies, including compiler debugging and optimization, industrial control systems, flight control and simulation systems, traffic control systems, house-hold appliances, and other systems/technologies that use assembly language coding.

Figure 1:
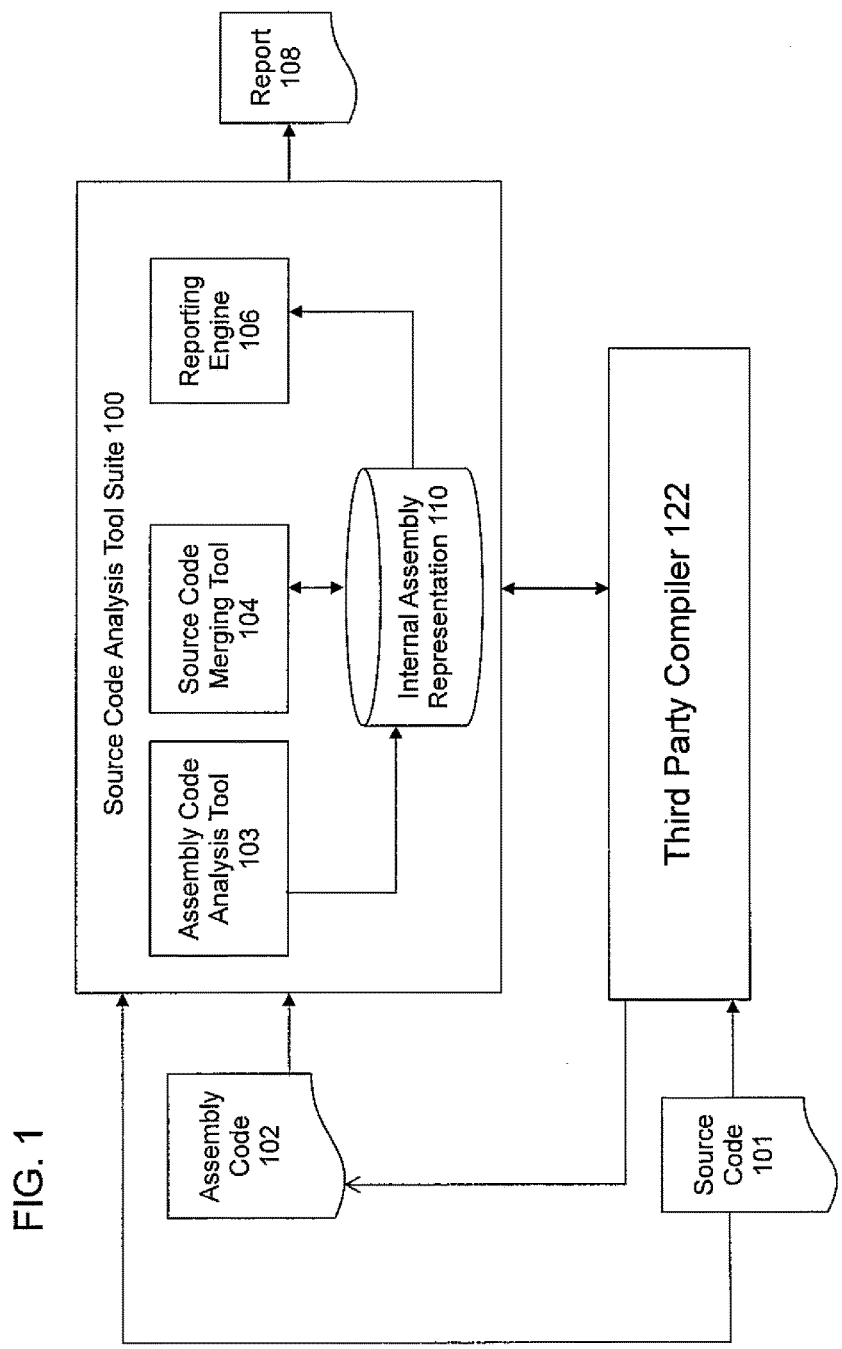
FIG. 1 is a simplified block diagram of an exemplary assembly language code analysis software tool, according to some embodiments of the disclosed invention.

FIG. 1 is a simplified block diagram of an exemplary assembly language code analysis software tool, according to some embodiments of the disclosed invention. As shown, a high-level source code 101 is compiled by a third party compiler 122 into assembly language source code 102 under the control of source code attribution tool suite 100. The assembly language source code is analyzed by an assembly code analysis tool 103 and an internal representation of the assembly language source code is stored in memory 110. The high-level source code 101 is then merged (compared) by a source code merging tool 104 with the internal representation, for example, by applying pattern matching techniques to identify corresponding patterns of code between the high-level source code and the low-level assembly code. The identified corresponding patterns of code are then stored in the internal representation.

A reporting engine 106 uses the internal representation stored in memory 110 to produce a report file 108, such as an interleaved assembly report depicted in FIG. 4.

Figure 2:
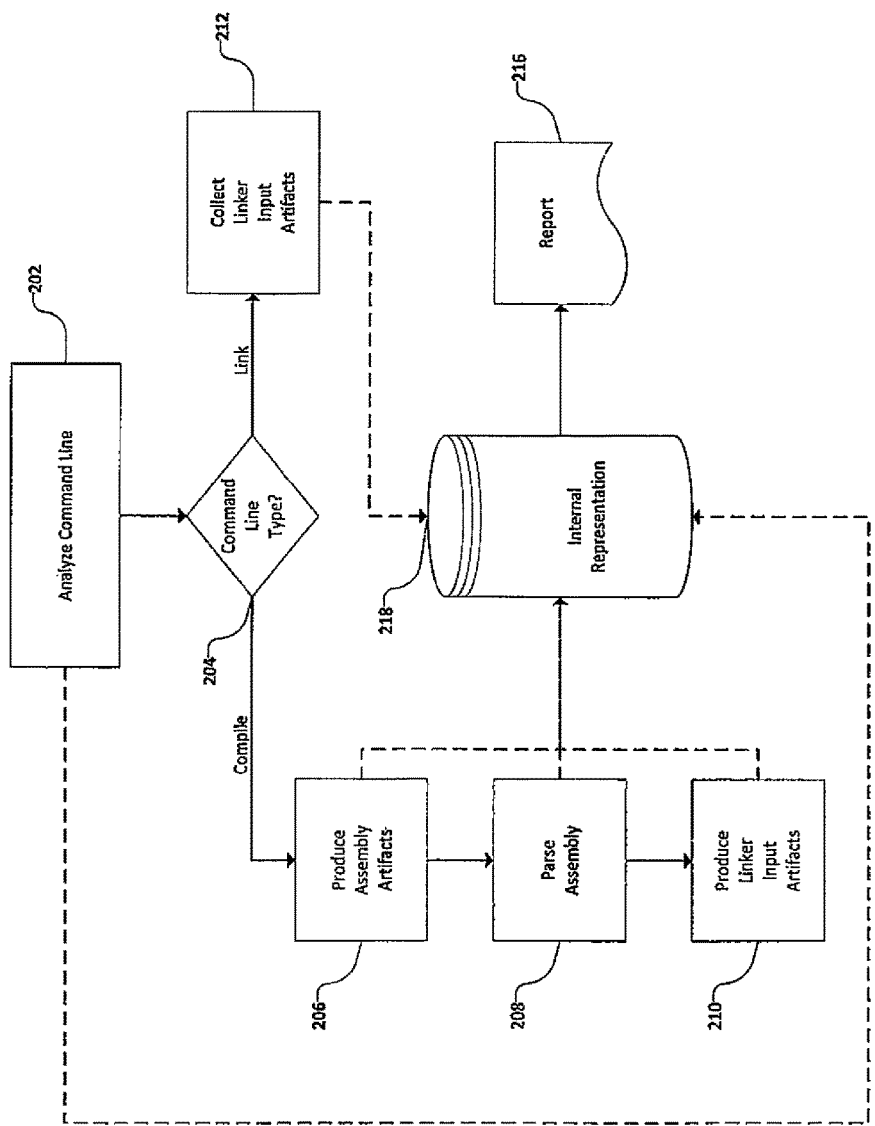
FIG. 2 illustrates a more detailed process flow diagram for improving high-level source attribution of assembly language code, according to some embodiments of the disclosed invention.

FIG. 2 illustrates a more detailed process flow diagram for improving high-level source attribution of assembly language code, according to some embodiments of the disclosed invention. As shown in block 202, when a high-level source code is to be compiled and/or linked, compiler and/or linker commands are analyzed by grouping arguments into categories to determine whether they are compiler, linker, or irrelevant commands (such as, archiving or filesystem manipulation commands). For example, '–c' can be considered, in some toolchains, to denote a compilation action and the option '-shared', in some toolchains, is considered to denote a link action. If it is determined in block 204 that the analyzed commands are compiler commands (i.e., the high-level code is being compiled), then a native toolchain compiler is invoked to produce assembly language code and the internal representation (218) is created from a parse of the original high-level source code, in block 206. This internal representation (218) is then stored in a computer memory.

The disclosed invention then parses the assembly code and updates the internal representation of the assembly code in block 208, by assigning generic tokens to categorize each kind of low-level assembly construct in order to abstract away machine specific details. For example, in all machine languages, there is the concept of the "jump" instruction, which changes the flow of execution from the next instruction to another target instruction. In a given machine language, there exists one or more mnemonics for a jump instruction, for example, br, jmp, etc. The internal representation uses a generic token as an abstraction of this category of mnemonics. This internal representation of the assembly code is then associated with the high-level source code previously stored by using pattern matching techniques, for example, the produced assembly code can be matched against a native toolchain compiler produced interleaved report. The disclosed invention then produces associated artifacts for linking, (e.g. object code files) in block 210, by invoking the native toolchain assembler. At this time, the internal representation 218 is updated to note that this compilation unit has been fully processed. At this point, an interim report can be generated from the updated internal representation 218, in block 216

If it is determined (in block 204) that the analyzed commands are linker commands (i.e., the object code files of the high-level code are being linked), then a native toolchain linker is invoked in block 212 where in the linker may choose to update the binary linker input artifacts. If so, the internal representation (218) is updated with the new link information, (e.g. resolution of missing or duplicated symbols). If there are unresolved dependencies, such as missing template instantiations, the native toolchain linker generally re-invokes the native toolchain compiler to provide the missing instantiations. This invocation of the compiler may be automatically intercepted to cause the process to re-enter at block 202 for that compilation and eventually to re-enter at block 202 for another link process. This process (of recompilation and relink) may be repeated until all dependencies are resolved. In block 216, a report file is generated from the stored updated internal representation (218). This report is an aggregate of all compilations associated with the final and fully resolved links. If additional linker input artifacts are produced by the linker, which require compilation, that compilation command is automatically intercepted and analyzed as above.

In some embodiments, the disclosed invention is a non-transitory compute readable storage medium for storing a computer program for tracking high-level source attribution of a generated assembly language code, the computer program when executed by a computer preforms the above-described processes.

Figure 3:
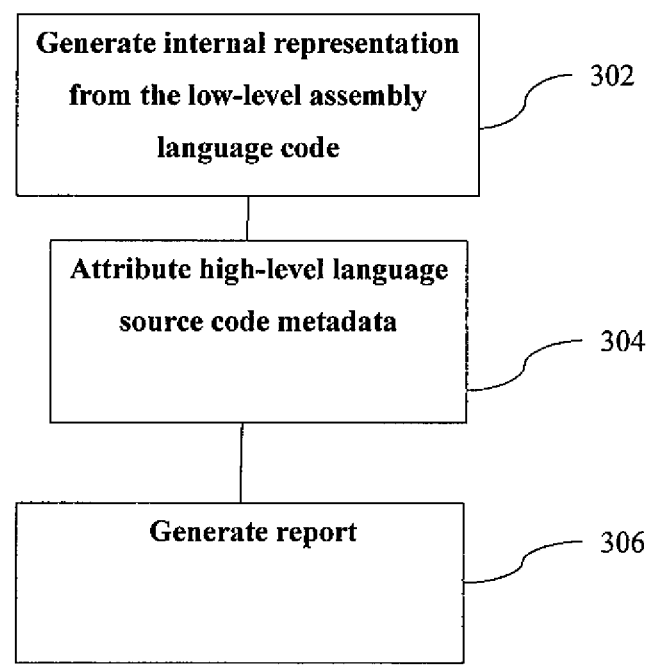
FIG. 3 is a simplified process flow diagram for correlating low-level assembly language code to its high-level original source code, according to some embodiments of the disclosed invention.

FIG. 3 is a simplified process flow diagram for correlating low-level assembly language code to its high-level original source code, according to some embodiments of the disclosed invention. In some embodiments, the disclosed invention maps low-level assembly language code generated by compiling original high-level language code, including template instantiations, inline functions, and preprocessor function-like macros back to the original high-level language code. In block 302, an internal representation of the assembly language code is generated by tagging different low-level assembly language constructs with extended metadata. For example, control flow modification instructions (commonly known as branch instructions) are identified as such, see line 21 of FIG. 4. This metadata abstracts away the machine dialect allowing for generic analysis.

In block 304, the internal representation of the low-level assembly language code is utilized to attribute high-level source code metadata to determine generic patterns of the low-level code by using pattern matching techniques to find the correlations between the low-level assembly language code and the original high-level language source code. For example, Listing 1, line 4 shows an example of a preprocessor function-like macro which, once compiled into low-level assembly language code, will produce low-level assembly code similar to FIG. 4, lines 53-56.

A report is then generated from the internal representation including, original high-level language metadata, and the original source, in block 306. This is accomplished by iterating over the internal representation and associating original high-level language source code. The report may include original high-level language source code mixed with low-level assembly language code that includes information as to where and for which data types a template was instantiated and the original location of code defined in preprocessor macros and inline definitions, and their low-level assembly language code representations. An exemplary low-level assembly language interleaved report/file is depicted in FIG. 4 and described below.

Listings 1 through 4 are examples of high-level language source code program files which demonstrate some of the difficulties with performing high-level language source code attribution in produced low-level assembly language code. Listing 1 contains a preprocessor function-like macro. During compilation, a preprocessing phase replaces instances of this macro text with the supplied substitution. This causes a loss of correlation of the original macro high-level language source code during compilation into low-level assembly language code.

---
LISTING 1: Pre-processor Directive Header File
--- preprocessor_directives.h, c++ header file
1. // A preprocessor function-like macro to demonstrate the ability of the
2. // tool to map such things back to source
3.
4. #define getmax(a,b) ((a)>(b)?(a):(b))

Listing 2 is an example of a template declaration in the C++ programming language, a high-level construct which contains a code pattern. The compiler will instantiate the pattern automatically based upon other code constructs. During compilation to low-level assembly language code, the correlation from these declarations to the actual instantiations is lost.

---
LISTING 2: Template Header File
--- templates.h, c++ header file
1. // This file declares and defines a template function to demonstrate
2. // mapping of such constructs back to source
3.
4. template<class T>
5. T template_foo(T item) {
6. return item * item;
7. }

Listing 3 is an example of inline functions in the C++ programming language. These pose a similar problem to function-like preprocessor macros. However, the compiler is responsible for the substitution. The problem remains that there is no correlation from the declaration of the inline functions to the use of them in the generated low-level assembly language code.

---
LISTING 3: Inline Header File
--- inlines.h, c++ header file
1. // This is an example of declaration and definition of inline functions
2.
3. // In this example we're using stdlib, rand and srand library functions
4. // in order to defeat compiler optimizations for trivial empty functions
5. // which would not generate any code.
6. #include <stdlib.h>
7. inline void inline_bar_set(int val) {
8.    srand(val);
9. }
10. inline int inline_bar_use(void) {
11.    return rand( );
12. }

Listing 4 is an example in the C++ programming language of a main program which uses the constructs from listings 1 through 3. During compilation, all of the low-level assembly language code generated from the original high-level language source code files will be embedded within a generated object code file without correlation. The described invention produces the missing correlation described previously.

---
LISTING 4: Main Program File
---

Interleaver_example.cc, c++ source file
1. // This is the main compilation unit
2.
3. #include "templates.h"
4. #include "inlines.h"
5. #include "preprocessor_dirctives.h"
6. #include <stdio.h>
7.
8. int main(void) {
9.    int temp = 19;
10.   int temp2;
11.
12.   inline_bar_set(template_foo(128)); // Calling inline and template functions
13.   do {
14.      temp = inline_bar_use( ) % 10; // Calling inline function
15.      temp2 = inline_bar_use( ) % 173; // Calling inline function
16.      printf("Random numbers: %d, %d\n", temp, temp2);
17.   } while (getmax(temp,temp2) != 0); // Calling preprocessor function-like macro
18.   return temp;
19. }

FIG. 4 illustrates an exemplary low-level assembly language code interleaved report file, according to some embodiments of the disclosed invention. For example, a programmer involved in a regulated field (such as those regulated by DO-178) would use this report to prove compliance with low-level assembly language code coverage requirements. Additionally, a programmer involved in mission critical fields (such as those covered by MISRA) would use this report to confirm and prove that the compiler is generating correct low-level assembly language code. As shown, the interleaved report file includes original high-level language source code mixed with low-level assembly language code that includes information as to where and for which data types a template was instantiated, and also code defined in preprocessor macros, inline definitions and their corresponding low-level assembly language code representations. For instance, line 1 shows an example of a reference to original high-level language source code giving the corresponding line number and file name. While line 3 is an example of a template instantiation, in this case template "foo" has been instantiated with an "int" data type.

Lines 4-11 specify the low-level assembly language code and corresponding interleaved original high-level language source code of the template instantiation in line 3. These lines are a direct result of the invention. Line 19 shows an example of a call to the instantiated template from line 3, where the original high-level language source code file name and line number of the template instantiation are also provided. Lines 23-26 depict an example of an inline function expansion with the low-level assembly language code and interleaved original high-level language source code. This attribution is only possible through the disclosed invention.

Lines 51-56 are an example of a preprocessor function-like macro expansion with low-level assembly language source code and interleaved original high-level language source code. This is the result of the disclosed invention. The remaining lines show the original high-level language source code from the low-level assembly language code, similar to existing tools, which already show interleaved low-level assembly language code and original high-level language source code.

In some embodiments, the disclosed invention performs dynamic test coverage analysis of generated low-level assembly language code and attributes the coverage data to high-level language code. The test coverage analysis can help to verify compiler correctness, complete test case coverage, and code correctness to requirements. The disclosed invention produces an instrumented executable binary image file and associated static coverage data ready for execution, by invoking the compiler and linker as appropriate and recording the static coverage data in the internal representation. The image file is then executed on some target computer and the dynamic coverage data is extracted from the image using existing tools and technology. For example, for a native executable the dynamic coverage, data is automatically extracted to the file system. For an embedded target, the machine must be paused, and the memory extracted using the compiler supplied toolchain. The dynamic coverage data and the static coverage data are then merged by the invention to produce various report files.

Figure 5:
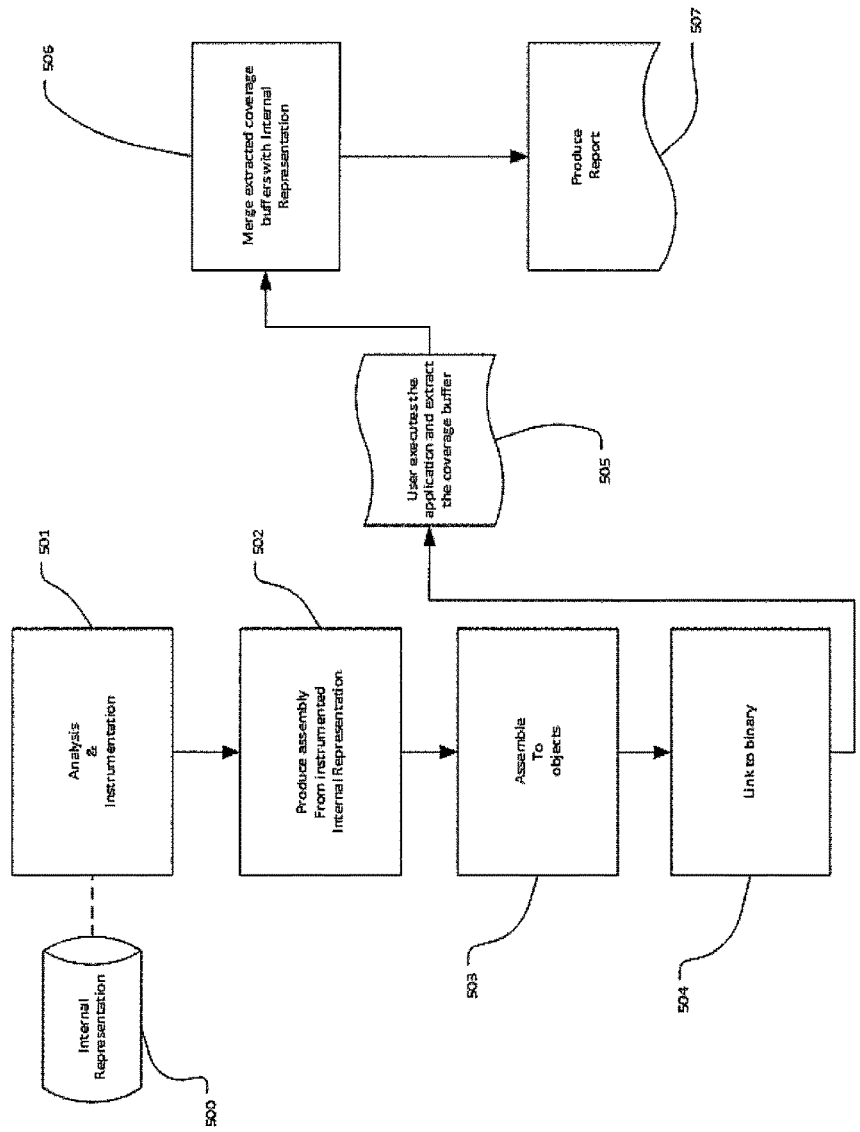
FIG. 5 is a simplified process flow diagram for producing test coverage metrics from internal representation data, according to some embodiments of the disclosed invention.

FIG. 5 is a simplified process flow diagram for producing test coverage metrics from internal representation data, according to some embodiments of the disclosed invention. In these embodiments, the disclosed invention uses internal representation data 500, obtained from the process described in FIG. 2 above, to produce test coverage metrics. In block 502, the internal representation data is analyzed and instrumented for coverage metrics. For example, FIG. 4, lines 9 and 10 are an exemplary basic assembly block. Instrumentation can be inserted between lines 9 and 10, to record coverage information for this block including addresses branched to on line 10. The resulting new internal representation is then used to produce new instrumented low level assembly language source code, in block 504. The resulting low level assembly language source code is then assembled to produce object code, in block 506. Object modules, with or without instrumentation, are then linked together to produce an executable binary image file, in block 508.

The resulting executable binary image file is then executed and the dynamic coverage information is extracted from the image file, in block 510, as previously explained. The disclosed invention then merges the dynamic coverage information and the internal representation data, in block 506. For example, the dynamic coverage information for each basic block and each branch instruction is applied to the internal representation (Intermediate Language). Finally, in block 507, the merged internal representation data is used to produce various coverage reports, for example similar to the one depicted in listing 5, below.

Listing 5: Sample report file

```
 1T1 template_foo<T1>(T1) [with T1=int]:
 2         *** mullw      r3, r3, r3
 3         [T] blr
 4       --------------
 5       | Jumped To: |
 6       --------------
 7         - Fourth instruction in main
 8main:
 9         *** li r30, 19
10         *** li r3, 128
11         [T] bl T1 template_foo<T1>(T1) [with T1=int]
12         [T] bl srand
13       .L30:
14         [T] bl rand
15         *** modwi r30, r3, 10
16         [T] bl rand
17         *** modwi r30, r3, 173
18         *** ldw r3, .L47
19         *** mr r4, r30
20         *** mr r5, r31
21         [T] bl printf
22         *** mr r12, r31
23         *** cmpw         r30, r31
74         [T/F] ble.L48
25         !!! mr r12, r30
26       .L48:
27         *** cmpwi        r12, 0
28         [F/T] bne        .L30
29         *** mr r3, r30
30         [T] blr
31       --------------
32       | Jumped To: |
33       --------------
34         - Address 0x1A2B3C4D
35
36       .L47: .stringz "Random numbers: %d, %d\n"
```

Listing 5 is a sample report file according to some embodiment of the disclosed invention. As depicted, line 3 is an indirect branch. Lines 4-7 comprise a table describing all destinations of the branch (see also, lines 30-34). Line 11 is a direct branch, where the markup '[T]' shows that this branch was executed at least once (see also, lines 12, 14, 16, and 21). Line 24 is a conditional branch, where the markup '[T/F]' denotes that this conditional branch was always taken and was never bypassed (it always jumped to '.L48' on line 26, and line 25 was never executed). Line 25 is an example of unexecuted non-branching code, where the markup '!!!' indicates non-executed non-branching code. Lines 2, 9, 15, 17-20, 22-23, 27, 29 are examples of executed non-branching code, where the markup '***' indicates executed non-branching code. The markups in the depicted Listing 5, can be alphanumerical characters, graphics, animation, icons, each with different color schemes to make it easy for the user to review the results.

It will be recognized by those skilled in the art that various modifications may be made to the illustrated and other embodiments of the disclosed invention described above, without departing from the broad inventive scope thereof. It will be understood therefore that the disclosed invention is not limited to the particular embodiments or arrangements disclosed, but is rather intended to cover any changes, adaptations or modifications which are within the scope and spirit of the invention as defined by the appended claims and drawings.

The invention claimed is:

1. A computer implemented method for tracking high-level source attribution of a generated assembly language code, the method comprising:
  receiving commands for compiling or linking a high-level language code;
  analyzing the received commands to determine whether a command is a compiler command for compiling the high-level language code or a link command for linking the low level object code;
  when the command is a compiler command:
    generating assembly language code by compiling the high-level language code,
    parsing the generated assembly language code to generate an internal representation for the assembly language code,
    storing the internal representation in a computer memory; and
    generating associated linker input artifacts for linking;
  when the command is a link command:
    updating the internal representation with the associated linker input artifacts;
  generating a report file from the updated internal representation instrumenting the updated internal representation for coverage metrics;
  generating instrumented low level assembly language source code from the instrumented internal representation;
  assembling the instrumented low level assembly language source code to produce object code, linking the object modules in the object codes to produce an executable binary image file;
  executing the executable binary image file to extract dynamic coverage information; and
  merging the dynamic coverage information and the updated internal representation to produce test coverage reports.

2. The method of claim 1, wherein the internal representation for the assembly language code is generated by assigning generic tokens to categorize each kind of low-level assembly construct in order to abstract away machine specific details.

3. The method of claim 1, wherein the unresolved and missing metadata is resolved by matching missing information to template declarations, preprocessor function-like macros, and inline functions using pattern matching.

4. The method of claim 1, further comprising generating test coverage metrics from the updated internal representation.

5. The method of claim 4, further comprising using the test coverage to verify correctness of a compiler comping the high-level language code.

6. The method of claim 1, wherein the report file includes line by line listing of attribution in the assembly language source code of a corresponding high-level source code constructs.

7. The method of claim 1, wherein the report file includes an aggregate of all compilations associated with final and resolved links.

8. The method of claim 1, wherein the report file includes the high-level language code mixed with low-level assembly language code that includes information as to where and for which data types a template was instantiated and an original location of code defined in macros and inline definitions, and their low-level assembly language code representations.

9. The method of claim 1, further comprising using the report file to prove compliance with low-level assembly language code coverage requirements.

10. The method of claim 1, further comprising using the report file to confirm and prove that the compiled high-level language code is correct low-level assembly language code.

11. A non-transitory compute readable storage medium for storing a computer program for tracking high-level source attribution of a generated assembly language code, the computer program when executed by a computer preforming a process comprising:
  receiving commands for compiling or linking a high-level language code;
  analyzing the received commands to determine whether a command is a compiler command for compiling the high-level language code or a link command for linking the low level object code;
  when the command is a compiler command:
    generating assembly language code by compiling the high-level language code,
    parsing the generated assembly language code to generate an internal representation for the assembly language code,
    storing the internal representation in a computer memory; and
    generating associated linker input artifacts for linking the internal representation;
  when the command is a link command:
    updating the internal representation with the associated linker input artifacts;
    generating a report file from the updated internal representation;
    instrumenting the updated internal representation for coverage metrics;
    generating instrumented low level assembly language source code from the instrumented internal representation;
    assembling the instrumented low level assembly language source code to produce object code, linking the object modules in the object codes to produce an executable binary image file;
    executing the executable binary image file to extract dynamic coverage information; and
    merging the dynamic coverage information and the updated internal representation to produce test coverage reports.

12. The non-transitory compute readable storage medium of claim 11, wherein the internal representation for the assembly language code is generated by assigning generic tokens to categorize each kind of low-level assembly construct in order to abstract away machine specific details.

13. The non-transitory compute readable storage medium of claim 11, wherein the unresolved and missing metadata is resolved by matching missing information to template declarations, preprocessor function-like macros, and inline functions using pattern matching.

14. The non-transitory compute readable storage medium of claim 11, further comprising computer program for generating test coverage metrics from the updated internal representation.

15. The non-transitory compute readable storage medium of claim 14, further comprising computer program for using the test coverage to verify correctness of a compiler comping the high-level language code.

16. The non-transitory compute readable storage medium of claim 11, wherein the report file includes line by line listing of attribution in the assembly language source code of a corresponding high-level source code constructs.

17. The non-transitory compute readable storage medium of claim 11, wherein the report file includes an aggregate of all compilations associated with final and resolved links.

18. The non-transitory compute readable storage medium of claim 11, wherein the report file includes the high-level language code mixed with low-level assembly language code that includes information as to where and for which data types a template was instantiated and an original location of code defined in macros and inline definitions, and their low-level assembly language code representations.

* * * * *